United States Patent
Jang et al.

(10) Patent No.: US 10,152,502 B2
(45) Date of Patent: Dec. 11, 2018

(54) SYSTEMS, APPARATUSES, METHODS, AND COMPUTER READABLE MEDIA FOR PROCESSING AND ANALYZING BIG DATA USING COLUMNAR INDEX DATA FORMAT

(71) Applicant: NAVER Corporation, Seongnam-si, Gyeonggi-do (KR)

(72) Inventors: Jeongho Jang, Seongnam-si (KR); Seonggoo Kang, Seongnam-si (KR); Jung Soo Ha, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 366 days.

(21) Appl. No.: 15/044,327

(22) Filed: Feb. 16, 2016

(65) Prior Publication Data
US 2016/0239527 A1  Aug. 18, 2016

(30) Foreign Application Priority Data

Feb. 16, 2015 (KR) .......................... 10-2015-0023663

(51) Int. Cl.
*G06F 17/30* (2006.01)
*G06F 17/22* (2006.01)

(52) U.S. Cl.
CPC .... *G06F 17/30321* (2013.01); *G06F 17/2276* (2013.01); *G06F 17/30424* (2013.01)

(58) Field of Classification Search
CPC combination set(s) only.
See application file for complete search history.

(56) References Cited

U.S. PATENT DOCUMENTS

| 8,700,674 B2* | 4/2014 | Bear ................. G06F 17/30312 707/802 |
| 2014/0201244 A1* | 7/2014 | Zhou ...................... G06F 17/30 707/803 |
| 2015/0074151 A1* | 3/2015 | Chaiken ............ G06F 17/30569 707/803 |

FOREIGN PATENT DOCUMENTS

| JP | 2004362040 A | 12/2004 |
| KR | 101255639 B1 | 4/2013 |
| WO | WO-2015017361 A1 | 2/2015 |

OTHER PUBLICATIONS

Korean Office Action dated May 13, 2016 to corresponding Korean Application No. 10-2015-0023663.
Korean Office Action dated Apr. 10, 2017 for corresponding Korean Patent Application No. 10-2017-0002861.

* cited by examiner

*Primary Examiner* — Shyue Jiunn Hwa
(74) *Attorney, Agent, or Firm* — Harness, Dickey & Pierce, P.L.C.

(57) ABSTRACT

Provided are systems, apparatuses, methods and non-transitory computer readable media for efficiently processing and analyzing big data using a columnar index data format. A method of processing big data at a processing system configured as a computer may include generating a dictionary by sorting data based on a column unit of the big data; classifying the sorted data into one or more data blocks for each dictionary based on a data size; generating an index that includes first data values of the respective data blocks in order of the data blocks, for each dictionary; and generating a column ID for each column based on row order of the big data.

13 Claims, 11 Drawing Sheets

FIG. 1 (RELATED ART)

| 100 | | | | | |
|---|---|---|---|---|---|
| Row group 1 | | | | | |
| Column 1 | Column 2 | Column 3 | Column ... | Column N-1 | Column N |
| Row group 2 | | | | | |
| Column 1 | Column 2 | Column 3 | Column ... | Column N-1 | Column N |
| Row group 3 | | | | | |
| ... | | | | | |

FIG. 4

| 410 | | 420 | | 430 | |
|---|---|---|---|---|---|
| Atlanta | 3 | Las Vegas | 1 | San Diego | 152 |
| Chicago | 28 | Los Angeles | 2795 | San Francisco | 2 |
| Dallas | 70 | Miami | 75 | Seattle | 654 |
| ⋮ | | ⋮ | | ⋮ | |
| Houston | N | New York | 987 | Washington, D. C. | 156 |

400

SYSTEMS, APPARATUSES, METHODS, AND COMPUTER READABLE MEDIA FOR PROCESSING AND ANALYZING BIG DATA USING COLUMNAR INDEX DATA FORMAT

CROSS-REFERENCE TO RELATED APPLICATION

This U.S. non-provisional application claims the benefit of priority under 35 U.S.C. § 119 to Korean Patent Application No. 10-2015-0023663 filed on Feb. 16, 2015, in the Korean Intellectual Property Office (KIPO), the entire contents of which are incorporated herein by reference.

BACKGROUND

Field

One or more example embodiments relate to technology for efficiently processing and analyzing big data using a columnar index data format, and more particularly, to processing systems, apparatuses, methods, and computer readable media that may enhance the query processing performance in a distributed environment through an efficient columnar index data format used for fast processing and analyzing big data.

Description of Related Art

With an increase in demand for collecting, storing, processing, and analyzing big data (i.e., data sets that include large volumes and/or complex sets of data that are not adequately processed using conventional or traditional data processing applications and techniques), various big data solutions have been released in the market in the forms of open source or proprietary products. These big data solutions may maintain vast volumes of data which have not been processed through existing technology and infrastructures for a long period of time and, therefore, value may be drawn from the processing of the data. A conventional basic operation method of executing a user-created program through a data full scan using a parallel process may apply various requirements of companies.

However, a tradeoff is present in using these types of software systems or techniques. A full scan method according to the related art generates a significantly large amount of disk and network input/output operations, even with simple queries. Thus, conventional data processing techniques for big data sets are very inefficient and may not guarantee fast processing times, i.e., a low latency, by reading only the required data from the big data. Also, a relatively long execution preparation time is required for map reduce data processing operations on the big data. Thus, the conventional method is unsuitable for fast response queries. To overcome the above issues and outperform conventional big data processing solutions, big data solution companies are actively conducting research on the following two questions: 1) Which data format is most suitable for a fast response time?; and 2) How to make an efficient distributed query engine to replace the conventional map reduce operations?

The distributed query engine may establish an improved and/or optimal execution plan based on a characteristic of a data format through an optimizer that is a key engine for efficiently processing a database query, such as a Structured Query Language (SQL) query, etc., in a distributed environment. Accordingly, many distributed query engine developers have designed a columnar data format capable of reducing system resource usage amounts of a disk or a network, and providing a fast response time, that is, a low latency by reading only data required for processing a query. However, due to issues with some full scan based processing techniques, the expected fast performance may not be achieved.

Examples of data formats according to the related art include a record columnar (RC) file, an optimized record columnar (ORC) file, a parquet, and a PowerDrill data format.

FIG. 1 illustrates an example of a configuration of a row group and a column partition according to the related art. Referring to table 100 of FIG. 1, data formats according to the related art use the same scheme of 1) commonly dividing data into row groups; and then 2) partitioning the divided data based on a column unit. The related art may achieve an efficient row reconfiguration by processing columns belonging to the same row group to be stored at adjacent locations on a disk.

Further, the data formats according to the related art have common goals, such as fast data loading, fast query processing, a highly efficient storage scheme, and adaptability to various workload patterns.

Big data requires an operation of processing large data. Thus, if data is not loaded at a high rate in a production environment, the format is unsuitable for big data. For example, when about 20 TB data is received every day, the resource usage amount of disks, networks, etc., increases significantly. In this example, since the amount of resources available for performing the query analysis may be insufficient, there is greater difficulty in executing the desired query operation. Accordingly, high performance data loading is required. At the same time, a fast response time, that is, a low latency is desired when processing data by excluding row groups/columns unnecessary for processing a query. The above data formats have been designed to generally process various queries quickly, instead of being optimized for some queries, by increasing a compression rate based on an aspect that in-column data has the same characteristic and by efficiently using a disk.

Under the common goals, the RC file has been configured using row groups, and designed to partition each row group into columns and to exclude a column unnecessary for processing a query. Based on the RC file, the ORC file has been designed to additionally store statistical information, such as a minimum value and a maximum value of each row group and to exclude a row group unused for processing a query. Through these techniques, the processing performance may be enhanced. The parquet supports a nested data model such as JavaScript Object Notation (JSON). The PowerDrill data format has reduced data storage capacity by additionally constructing a global/local dictionary and by expressing a field value using a bit-unit integer, and has also enhanced a processing rate, that is, a higher throughput.

However, the row group/column partition scheme commonly used in the above formats has disadvantages, such as inefficiencies of row group unit filtering and the frequent occurrence of unnecessary sequential disk accesses and/or random disk accesses to read a single column.

Additionally, by using statistical information of row groups alone, the row groups may not be accurately filtered. In other words, a disk operation of reading unnecessary row groups may occur using the conventional techniques. If filtering through a global dictionary is applied to enhance the efficiency, great processing and resource utilization costs are required in order to manage the global dictionary. The global dictionary scheme is used when the number of in-column unique values is significantly small compared to the entire column data, that is, when the number of in-column unique values can be processed in the limited system memory. However, in general, there are data that may not be processed with conventional big data processing techniques, for example, when the row group scheme corresponds to a form in which a row layout and a column layout are mixed. In the case of authentic column analysis, unnecessary columns are to be excluded through random access or sequential reading. Such operation may significantly degrade the performance. Accordingly, there is a need for a new data format that may overcome these disadvantages with the conventional techniques.

SUMMARY

Various example embodiments provide processing systems, apparatuses, methods, and computer readable media that may efficiently process and analyze big data using a columnar index data format. The example embodiments may quickly analyze and visualize data in various perspectives beyond a current situation of simply storing a large amount of data and providing a slow search/analysis, thereby enabling many people to acquire insight and to create value.

According to an aspect of at least one example embodiment, there is provided a method of processing a big data database at a processing system including at least one computer, the method including generating, using at least one processor of the at least one computer, at least one dictionary by sorting data of a big data database based on a column unit of the big data database, classifying, using the at least one processor, the sorted data into one or more data blocks for the at least one dictionary based on a desired data size, generating, using the at least one processor, an index that includes first data values of the respective data blocks in an order of the data blocks, for the at least one dictionary and generating, using the at least one processor, a column ID for each column of the at least one dictionary based on a row order of the big data.

The processing method may further include loading, using the at least one processor, the index to a memory of the at least one computer, comparing, using the at least one processor, data that is determined in response to a received query to first data of data blocks included in the index, and determining a data block including the determined data, reading, using the at least one processor, the determined data block and generating a response to the query using the data block.

The dictionary may include a row ID for identifying a row order in the big data database of each data included in a data block is stored in association with corresponding data.

The processing method may further include reconfiguring, using the at least one processor, at least one row of the big data database using the row ID of the data included in the dictionary.

The processing method may further include generating, using the at least one processor, a column ID block that stores a column ID as the row order of the big data, the column ID being a value for identifying a location or order of data of a corresponding dictionary.

The processing method may further include extracting, using the at least one processor, the column ID of a requested row order from the column ID block of the dictionary corresponding to a received query, and extracting data of the location or order corresponding to the extracted column ID.

Additionally, a non-transitory computer-readable medium may be provided that may have stored computer readable instructions, which when executed by at least one processor, configure the at least one processor to implement the processing method.

According to another aspect of at least one example embodiment, there is provided a processing apparatus configured in to process big data, the processing apparatus including a memory having computer readable instructions stored thereon, and at least one processor configured to execute the computer readable instructions to generate at least one dictionary by sorting data of a big data database based on a column unit of the big data database, classify the sorted data into one or more data blocks for the at least one dictionary based on a desired data size, generate an index that includes first data values of the respective data blocks in an order of the data block, for the at least one dictionary, and generating a column ID for each column of the at least one dictionary based on a row order of the big data. The at least one processor may be further configured to load the index to the memory, compare data that is determined in response to a received query to first data of data blocks included in the index, and to determine a data block including the determined data, and read the determined data block and to generate a response to the query using the data block.

The dictionary may include includes a row ID for identifying a row order in the big data database of each data included in a data block is stored in association with corresponding data.

The at least one processor may be further configured to reconfigure at least one row of the big data database using the row ID of the data included in the dictionary.

The at least one processor may be further configured to generate a column ID block that stores a column ID as the row order of the big data, the column ID being a value for identifying a location or order of data of a corresponding dictionary.

The at least one processor may be further configured to extract the column ID of a requested row order from the column ID block of the dictionary corresponding to a received query, and to extract data of the location or order corresponding to the extracted column ID.

According to another aspect of at least one example embodiment, there is provided a distributed big data database processing system including a plurality of distributed processing apparatuses, each of the plurality of processing apparatuses connected to a computer network and configured to store at least one portion of data associated with a big data database using a columnar index data format on a non-transitory computer storage medium, receive a transmitted big data database operation request, retrieve the data requested by the received big data database operation from the non-transitory computer storage medium using the columnar index data format, and transmit the retrieved data to at least one client computer.

The columnar index data format may include at least one dictionary, and the at least one dictionary may include a dictionary identifier, an index field, and a column ID field.

The index field may include references to at least one index block and the column ID field may include references to at least one column ID block.

The retrieving performed may further include loading the index field into the memory of the respective plurality of distributed processing apparatuses, determining data responsive to the received database operation, the determining including comparing data values of the at least one index block and determining a data block corresponding to the determined data value, and reading the determined data block from the corresponding non-transitory computer storage medium.

The corresponding non-transitory computer storage medium may be accessed over the computer network.

The big data database may be at least one of a Database Management Systems (DBMS) database, a Relational Database Management Systems (RDBMS) database, a SQL-based database, an Object-oriented relational database, a NoSQL database, a NewSQL database, and a structured language database.

The number of dictionaries may correspond to the number of columns in the big data database.

According to at least one example embodiment, it is possible to enable many people to acquire insight and to create value by efficiently processing and analyzing big data using a columnar index data format by reducing the processing and resource utilization overhead used, and by quickly analyzing and visualizing data in various perspectives beyond a current situation of simply storing a large amount of data and providing a slow search/analysis.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIG. 1 illustrates an example of a configuration of a row group and a column partition according to the related art;

FIG. 4 illustrates an example of a configuration of a dictionary according to at least one example embodiment;

Figure 2:
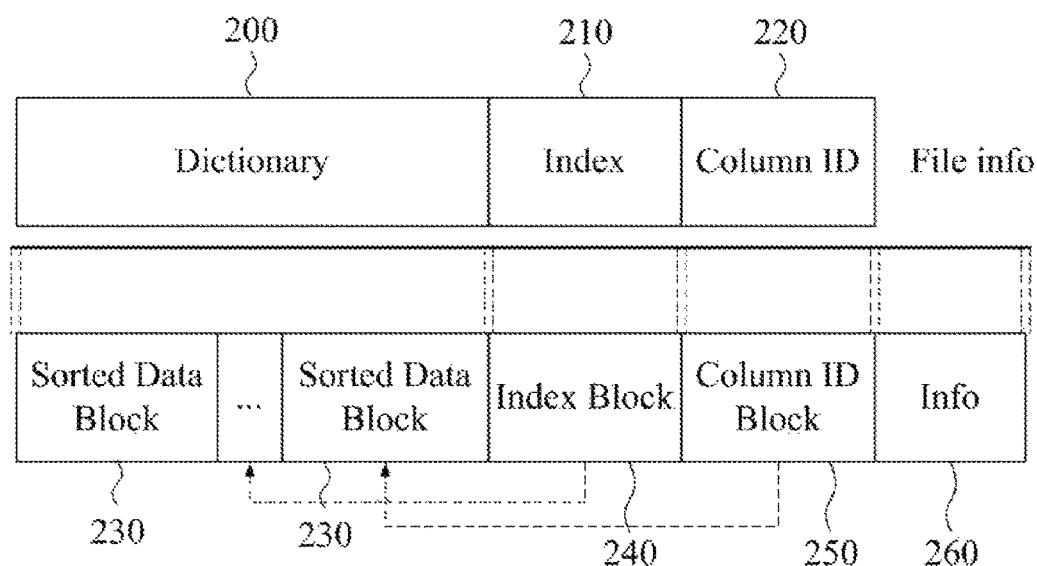
FIG. 2 illustrates an example of a columnar index data format according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Various example embodiments may be implemented using a database system, such as Database Management Systems (DBMS), Relational Database Management Systems (RDBMS), SQL-based DBMS systems, Object-oriented relational database systems, post-relational databases (e.g., NoSQL databases, NewSQL databases, structured language databases, XML databases, etc.), and/or the like, wherein data is stored in a row-type database schema layout for fast transaction processing or stored in a column-type database schema layout for fast analysis. Due to various disk (e.g., hard disk, solid-state drives, optical disk drives, tape drives, etc.) characteristics, random accesses have significantly negative consequences on the overall disk performance. To decrease the negative consequences on the overall disk performance, and facilitate greater performance, data is stored in a column type by storing data to be simultaneously read for processing at adjacent disk locations. That is, in a database in which processing, such as updating or deleting of a row, frequently occurs, data is stored based on a row unit. When extracting collected data or statistical data for each column, data is stored based on a column unit. Even in a database data format used for big data analysis, an analysis-based operation is performed rather than row-based processing. Accordingly, a database data format capable of storing data in a column type is desirable.

A columnar index (CI) file to be described in connection with the example embodiments is based on a column format. Here, database operations frequently performed by data analysts in the big data field will be referred to. The following two goals may be considered to reduce costs associated with low response times:

1. Fast data search using index; and
2. Fast collection and analysis using column layout.

A columnar index data format may have the following three key constituent elements with respect to a single column:

1. Dictionary

One or more dictionaries may correspond to one or more columns and may include sorted data blocks. A column having a small unique value through dictionary encoding may have a relatively excellent compression rate and may include row identifiers (IDs) to reconfigure a row corresponding to each value. For example, since a plurality of sets of data block data are sorted, orders of values within a single data block do not represent a row order. Accordingly, each value may have a row ID to identify an original row. Also, the row ID may be compressed using a compression method such as variable integer and the like.

2. Index

An index may include an offset for pointing to a data block of a database dictionary (referred to herein as "dictionary") that facilitates the quick retrieval of data associated with the dictionary. The index may be loaded to a processing system's memory and may be used to quickly retrieve a data block including the data to be retrieved.

3. Column ID

A column ID may point to a dictionary by storing a numerical value in row order. Additionally, if a column corresponds to an integer-type column, the column ID may point to a dictionary by using an integer value of the integer-type column as is. If necessary, the column ID may be compressed based on a block unit.

FIG. 2 illustrates an example of a columnar index data format according to at least one example embodiment.

Data formats may use the same scheme of 1) commonly dividing data into row groups; and then 2) partitioning the divided data based on a column unit.

According to various example embodiments, the columnar index data format may include a "dictionary" to describe various relationships between data, data blocks, and the database structure (e.g., columns, rows, etc., of the database), identifiers, etc. in the database. Referring to FIG. 2, a dictionary 200 according to at least one example embodiment, is a data structure that may include references and/or pointers to a plurality of data blocks (e.g., stored data blocks 230) in which a plurality of sets of data corresponding to at least one single column are sorted (e.g., alphabetical order, numerical order, time the data was entered, etc.). The partitioned data associated with the plurality of data blocks may be stored in a plurality of storage devices and/or storage locations (including physical, logical, network, virtual storage locations, etc.) for distributed parallel processing performed on a distributed computing system. A desired database query result may be acquired using data stored in the plurality of storage devices and/or storage locations.

Using an index, such as index 210, a data block including a value desired to be retrieved may be found among the plurality of data blocks (e.g., data blocks 230) included in the dictionary 200. To this end, the index block 240 of the index 210 may be configured to include a first data value of each data block. The range that includes a desired value may be verified from data values sorted within a block. Accordingly, the desired data may be extracted or retrieved.

A column ID 220 may store a numerical value in row order. For example, a first value of a column ID block 250 included in the column ID 220 may indicate a location of data of a first row of a corresponding column within a dictionary 200. For example, if the first value of the column ID block 250 is 10, the first value may indicate that the data of the first row of the corresponding column corresponds to the tenth data among data sorted within the dictionary.

If the corresponding column includes integer values, the column ID block 250 may store the corresponding values in row order. For example, if a first value of the column ID block 250 is 5, it is possible to know that a value of data of a first row of the corresponding column is 5.

An info 260 may include data of a file for the columnar index data format.

Figure 3:
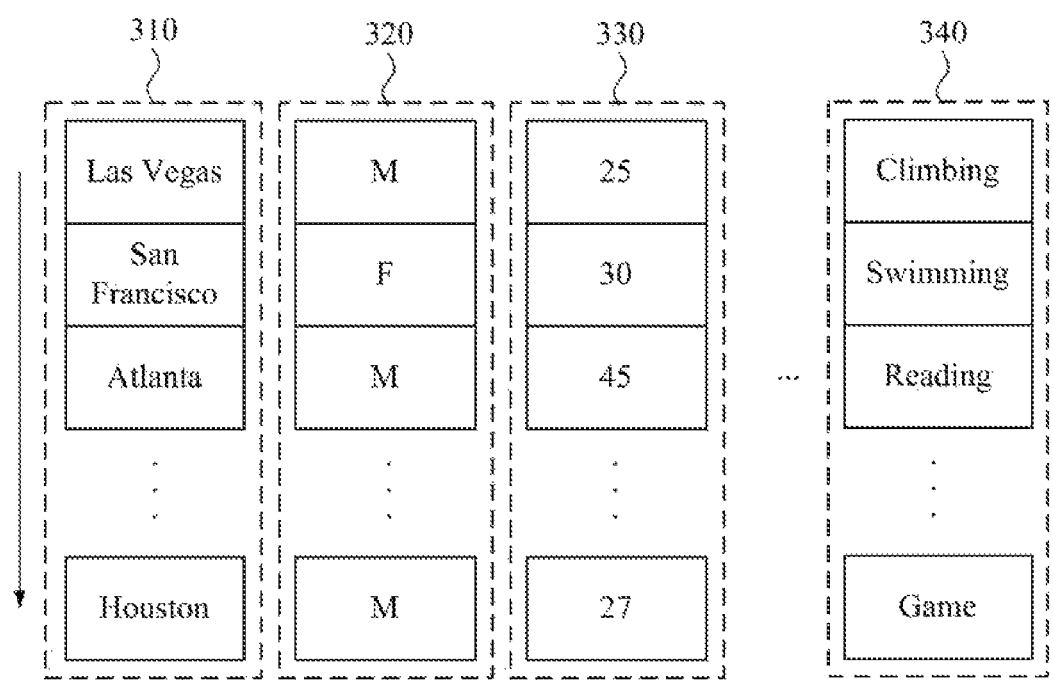
FIG. 3 illustrates an example of big data according to at least one example embodiment.

FIG. 3 illustrates an example of big data according to at least one example embodiment.

Referring to FIG. 3, a first box 310 indicated with dotted lines may refer to a column corresponding to a region name, a second box 320 indicated with dotted lines may refer to a column corresponding to a gender, a third box 330 indicated with dotted lines may refer to a column corresponding to an age, and a fourth box 340 indicated with dotted lines may refer to a column corresponding to a hobby. Here, a database may be configured so that a single column may correspond to a single dictionary, but example embodiments are not limited thereto and may have a single column corresponding to a plurality of dictionaries or vice versa.

FIG. 4 illustrates an example of a configuration of a dictionary according to at least one example embodiment.

Referring to FIG. 4, a first dictionary 400 corresponds to the column corresponding to the region names indicated by the first box 310 of FIG. 3 and includes three data blocks, for example, a fifth box 410, a sixth box 420, and a seventh box 430, each indicated with dotted lines. For example, a processing system may configure the first dictionary 400 including the three data blocks 410, 420, and 430 by sorting a plurality of sets of data of a column corresponding to region names based on values, and by classifying the sorted data into the three data blocks 410, 420, and 430. Here, each set of data included in the first dictionary may have an associated row ID where the data value may be found in an associated database dataset. For example, a row ID "3" corresponding to "Atlanta" may indicate that "Atlanta" is data of a third row in the column corresponding to the region name. The row ID may be used to reconfigure a row of the original big data through the first dictionary. For example, a third row in the big data of FIG. 3 may be acquired by collecting only data blocks associated with the row ID "3" from the entire set of dictionaries and then sorting the collected data blocks in column order.

Figure 5:
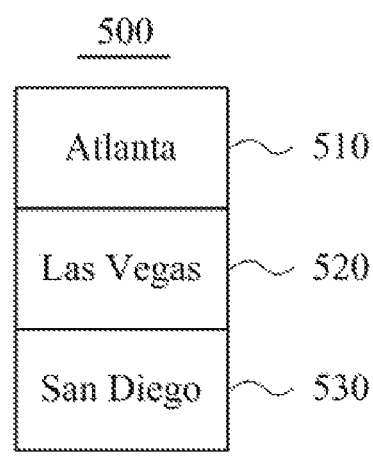
FIG. 5 illustrates an example of a configuration of an index according to at least one example embodiment.

FIG. 5 illustrates an example of a configuration of an index according to at least one example embodiment.

FIG. 5 illustrates an example of an index 500 associated with a dictionary, wherein the index includes the first data values of the three data blocks of FIG. 4. A first data value 510 "Atlanta" may represent a first data value of a data block indicated by the fifth box 410 of FIG. 4, a second data value 520 "Las Vegas" may represent a first data value of a data block indicated by the sixth box 420, and a third data value 530 "San Diego" may represent a first data value of a data block indicated by the seventh box 430. For example, in the case of searching for a region name starting with "H", "H" is located between "Atlanta" corresponding to the first data value 510 and "Las Vegas" corresponding to the second value "520". Thus, the region name starting with "H" may be stored in the data block indicated by the fifth box 410 can be immediately verified. Since the index is configured in the memory of the big data processing system, the processing system may quickly provide a result corresponding to the requested search or query submitted by a user operating the big data database, a client computer, an autonomous/automatic process (e.g., an artificial intelligence program, a search engine program, a structured information retrieval program, a cloud computing program, a scientific or mathematical computation program, a neural network system, etc.) or the like, by retrieving and/or accessing the desired data block. For example, in response to a query asking for "the number of users who live in Houston", the processing system may immediately retrieve a required data block and may very quickly acquire a desired result value by reading continuous data included in a single data block without the need to move between columns or rows.

As described above, since the original row for each data block can be immediately verified from the row ID associated with the dictionary, the original row for each data block may be identified based on the respective row ID.

Figure 6:
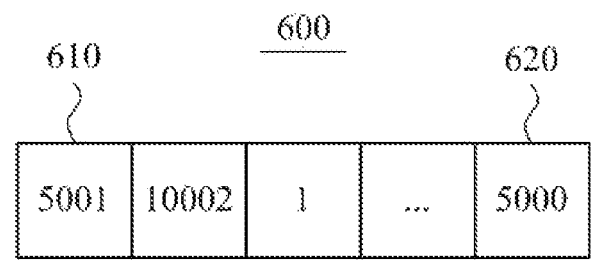
FIG. 6 illustrates an example of a configuration of a column ID according to at least one example embodiment.

FIG. 6 illustrates an example of a configuration of a column ID of a dictionary according to at least one example embodiment. A column ID block 600 may store one or more numerical values in row order. For example, a first value 610 "5001" may indicate a location at which the "Las Vegas" data value is located, i.e., the data of the first row of the column corresponding to the region name in the big data depicted in FIG. 3. For example, when each of the data blocks of FIG. 4 includes 5000 sets of data, the data indicated by "5001" representing the first data of the data block indicated by the sixth box 420 may be immediately verified. Also, that a last value 620 "5000" representing the last data of the data block indicated by the fifth box 410 may be immediately verified. Using the column ID, it is possible to immediately access a data block including data of a specific row in a corresponding column.

Also, in the case of a column of which a data value is provided in an integer form, the data value may be used as a value of a column ID block. For example, a column corresponding to an age indicated through the third box 330 of FIG. 3 may be used as the column ID block. In detail, the first value of the column ID block may be a first value "25" of the column. In this case, the processing system may immediately retrieve a desired row value from the column ID block without reading the data block.

Figure 7:
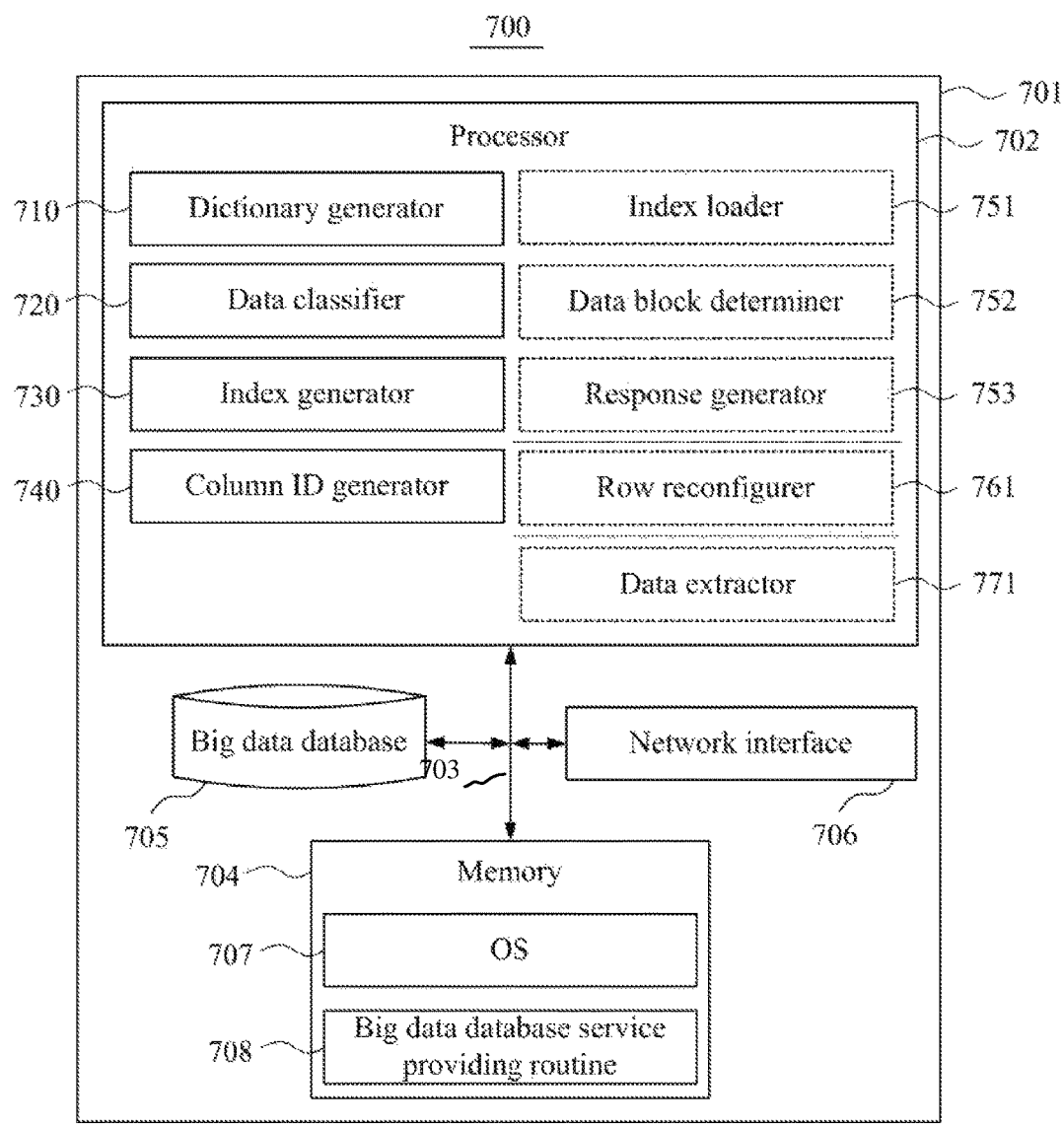
FIG. 7 is a block diagram illustrating a configuration of a processing system according to at least one example embodiment.

FIG. 7 is a block diagram illustrating a configuration of a processing system according to at least one example embodiment, and FIGS. 8 through 11 are flowcharts illustrating a processing method according to some example embodiments.

Referring to FIG. 7, a processing system 700 according to at least one example embodiment may be a computer system that stores, manages, and processes big data, and may be configured as a single computer apparatus 701 or a plurality of computer apparatuses communicating over a network (not shown). The computer apparatus(es) include at least one processor 702, a bus 703, a memory 704, a big data database 705, a network interface 706, etc. The memory 704 may include an operating system (OS) 707 and a big data database service providing routine 708. According to some example embodiments, when big data is not and/or cannot be stored in a single computer apparatus, the processing system 700 may be configured using a plurality of computer apparatuses that are provided for the respective dictionaries and/or data blocks of a dictionary and may thereby be correlated to one another.

The processor 702 may include a dictionary generator 710, a data classifier 720, an index generator 730, and a column ID generator 740. The dictionary generator 710, the data classifier 720, the index generator 730, and the column ID generator 740 may be configured to perform operations 810 through 840 of FIG. 8. The processor 702 may be configured by executing the computer readable instructions associated with the big data database service providing routine 708 stored in the memory 704. According to other example embodiments, the computer apparatus 701 and the processing system 700 may each include a greater or lesser number of constituent elements than the number of constituent elements shown in FIG. 7.

The memory 704 may include a mass storage device, such as a random access memory (RAM), a read only memory (ROM), a disc drive, a solid state drive, an optical drive, etc., as a non-transitory computer-readable storage medium. Also, program codes (e.g., computer readable instructions) for the OS 707 and the big data database service providing routine 708 may be stored in the memory 704. Such software constituent elements may be loaded from another non-transitory computer-readable storage medium separate from the memory 704 using a drive mechanism (not shown). The other non-transitory computer-readable storage medium may include, for example, a floppy disk, a hard disk, a tape storage device, a Bluray/DVD/CD-ROM, a memory card, etc. Software constituent elements may be loaded to the memory 704 through the network interface 706 instead of, or in addition to, the non-transitory computer-readable storage medium.

The bus 703 enables communication and data transmission between the constituent elements of the computer apparatus 701. The bus 703 may be configured using a high-speed serial bus, a parallel bus, a storage area network (SAN), and/or other appropriate communication technology.

The network interface 706 may be a computer hardware constituent element for connecting the computer apparatus 701 to a computer network. The network interface 706 may connect the computer apparatus 701 to the computer network through a wireless and/or wired connection. Additional computer apparatuses associated with the processing system 700 may be connected to the same computer network. Other computer apparatuses and/or computing devices, such as personal computers, servers, distributed computer systems, cloud computer systems, artificial intelligence systems, supercomputers, smartphones, tablets, smart devices, Internet of Things (JOT) devices, wearable devices, portable gaming devices, personal digital assistants (PDA), etc., may also connect to the same computer network and may perform operations related to the big data service provided by the processing system 700, such as access data, submit queries, store data to, retrieve data from, perform calculations on, etc.

The processor 702 may be configured to process computer-readable instructions of various computer programs by performing a basic arithmetic operation, a logic operation, and/or an input/output operation of the computer apparatus 701. The computer-readable instructions may be provided from the memory 704 and/or the network interface 706 to the processor 702 through the bus 703. The processor 702 may be configured to execute program codes for the dictionary generator 710, the data classifier 720, the index generator 730, and the column ID generator 740. These and other program codes may be stored in a storage device such as the memory 704.

Figure 8:
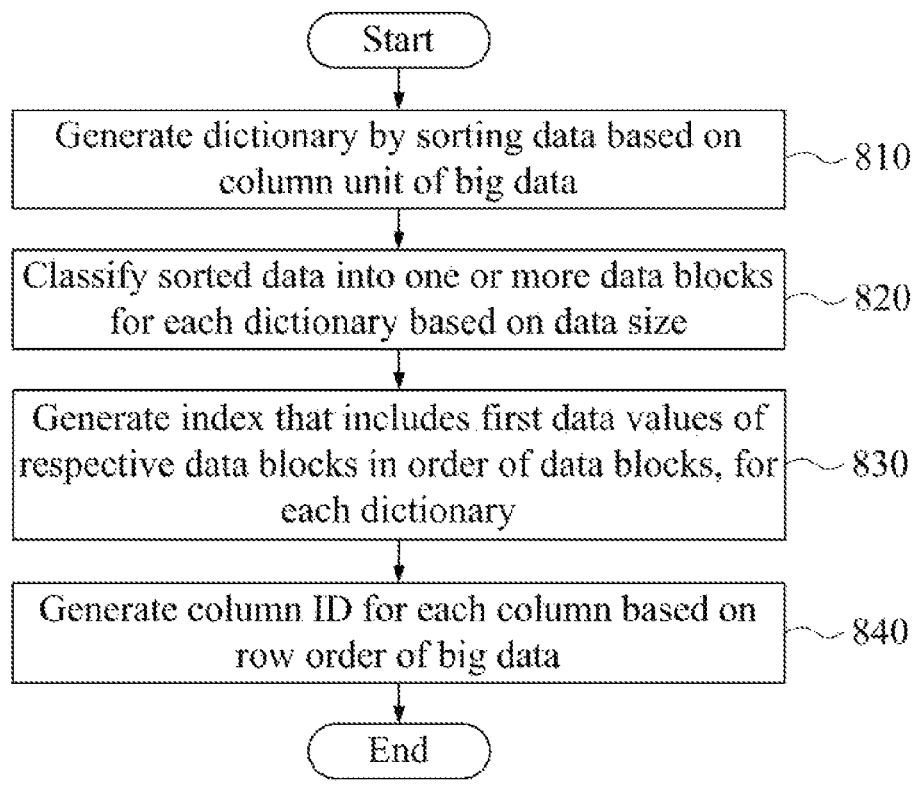
FIGS. 8 through 11 are flowcharts illustrating a processing method according to some example embodiments.

When executed by a processor, such as the processor 702, the computer-readable instructions associated with the dictionary generator 710, the data classifier 720, the index generator 730, and the column ID generator 740 transform the processor 702 into a special purpose processor configured to perform at least operations 810 through 840 of FIG. 8.

Referring now to FIG. 8, in operation 810, the dictionary generator 710 may generate a dictionary by sorting data based on a column unit of the big data database 705. For example, Korean language data may be sorted in order or inverse order of Korean characters, English language data may be sorted in order or inverse order of Alphabetical characters, etc., and number/numeral values may be sorted in descending order or ascending order, etc. A dictionary may correspond to a column in the big data database 705. The number of dictionaries corresponding to the number of columns may be generated. An example of a big data database is described in connection with FIG. 3 and an example of the dictionary is described in connection with FIGS. 4 and 5.

In operation 820, the data classifier 720 may classify the sorted data into one or more data blocks for each dictionary based on a desired data size. In the case of big data, a size of data to be included in a single column is generally large and thus, may not be readily stored in a single storage device and/or storage location. In this case, the data classifier 720 may classify, into a plurality of data blocks, data included in a single column. Such data blocks are described in connection with FIG. 5.

In operation 830, the index generator 730 may generate an index that includes first data values of the respective data blocks in the order of the data blocks, for each dictionary. That is, a first value of the index may be a first data value of a first data block of a corresponding dictionary.

In operation 840, the column ID generator 740 may generate a column ID for each column based on the row order of the big data. The column ID may be an offset value for pointing to a data block of a dictionary. In the case of a number-type column, actual numerical values of each column may be stored as the column ID. For example, the column ID is a value for identifying a location or order of data in the dictionary and may be stored in a column ID block based on the row order of the big data.

According to other example embodiments, the processor 702 may be further configured to execute program codes for an index loader 751, a data block determiner 752, and a response generator 753. These program codes may be stored in a storage device, such as the memory 704.

Figure 9:
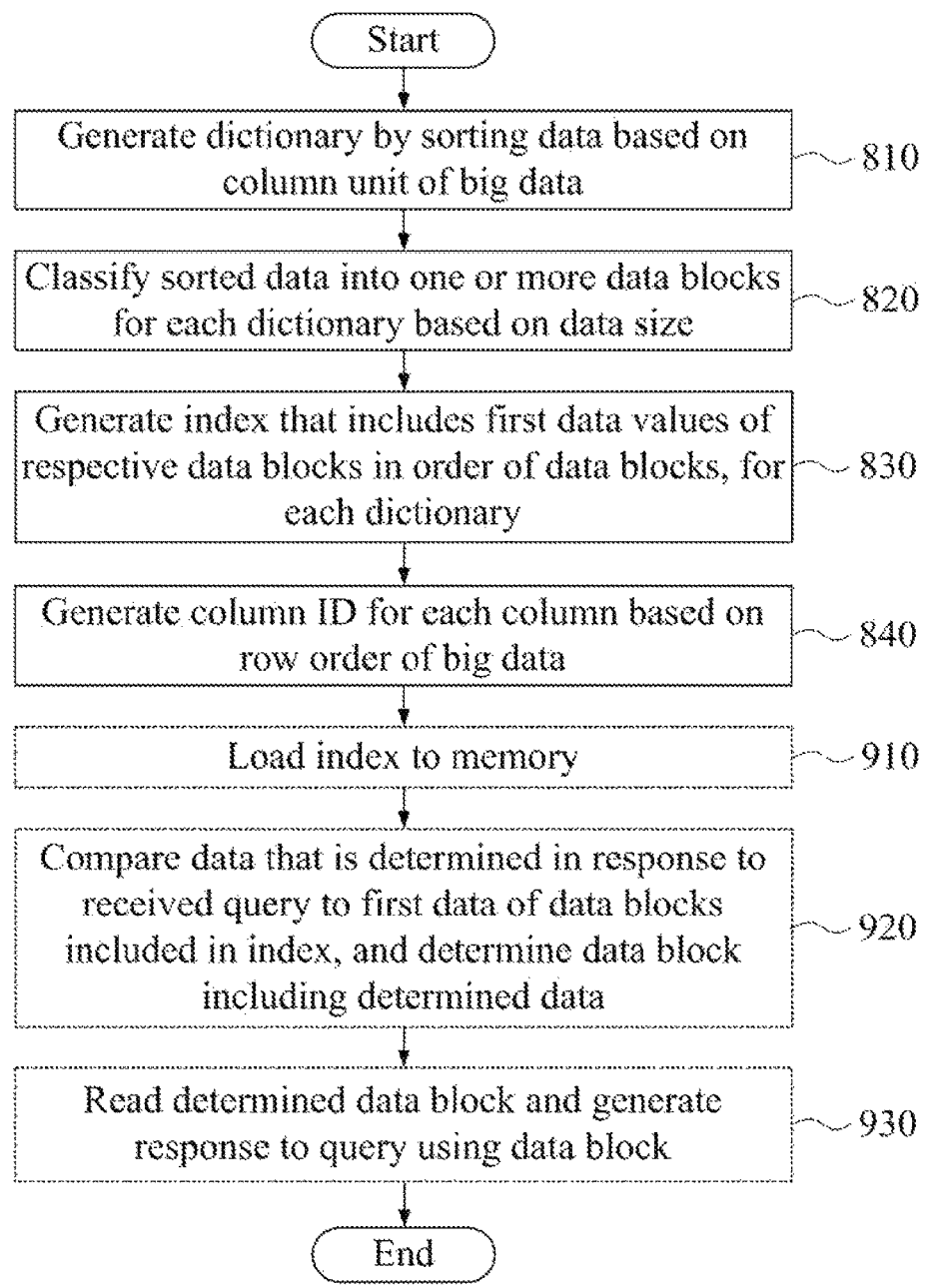
Figure 10:
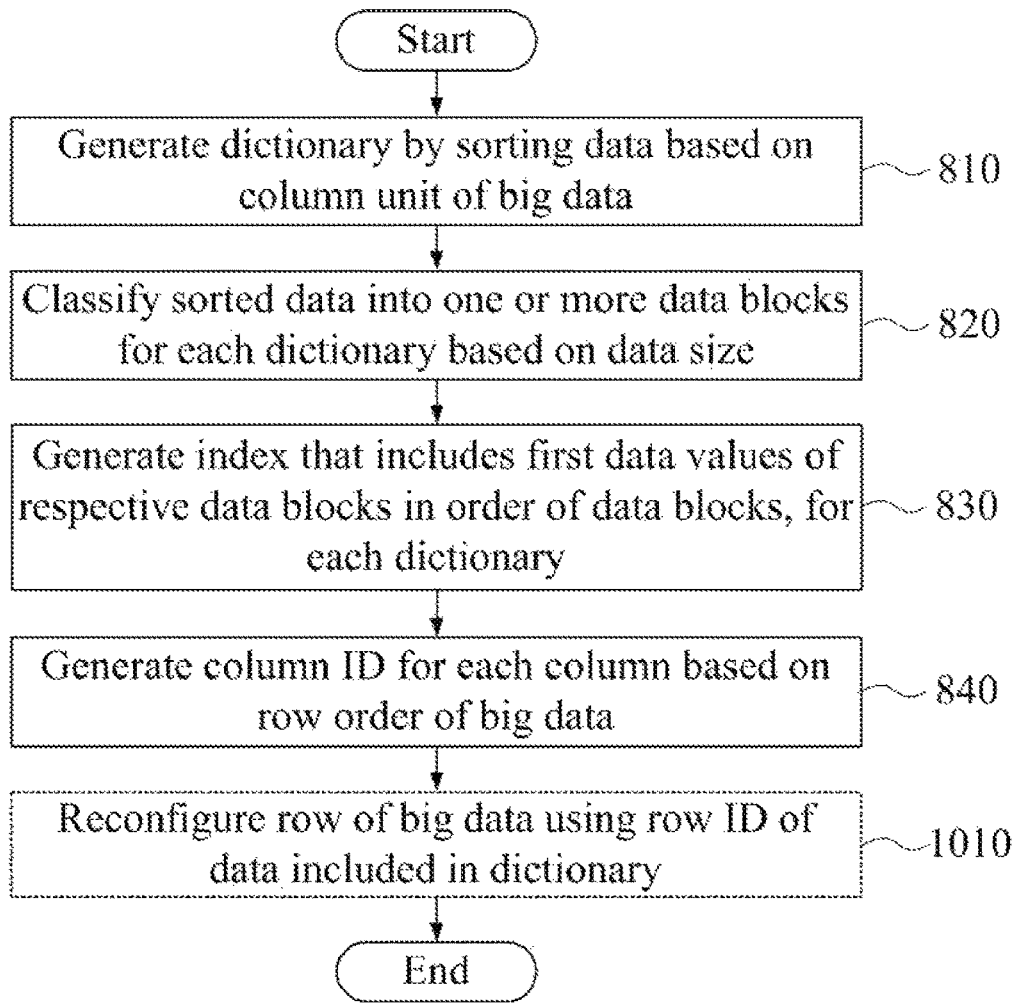
Figure 11:
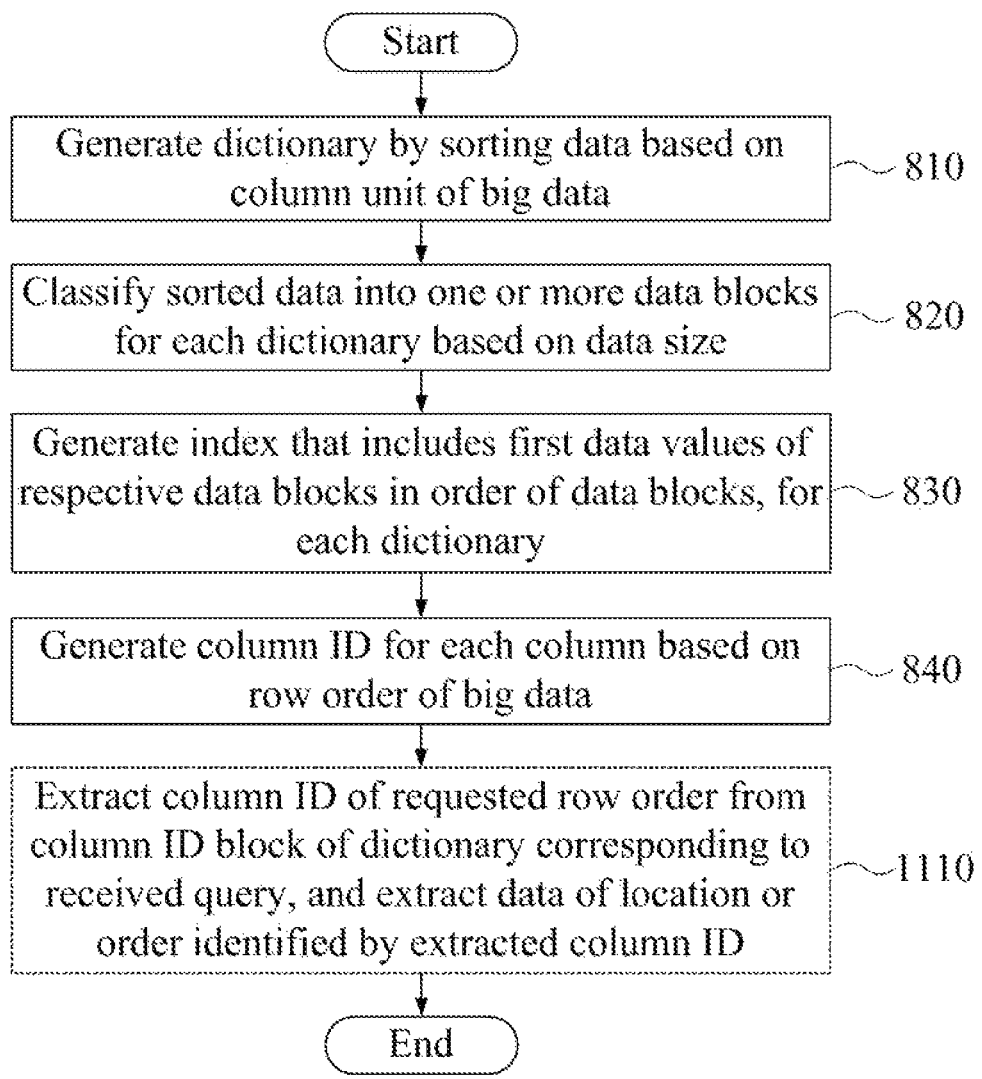

When executed by a processor, such as the processor 702, the computer-readable instructions associated with the index loader 751, the data block determiner 752, and the response generator 753 transform the processor 702 into a special purpose processor configured to perform at least operations 910 through 930 of FIG. 9, which may be further included in the processing method of FIG. 8.

In operation 910, the index loader 751 may load the index to a memory. Since the index includes only first data of the data blocks, the size of the index is significantly smaller when compared to the size of the big data database. The processing system 700 may quickly retrieve a data block that includes desired data using the index.

In operation 920, the data block determiner 752 may compare data that is determined in response to a received query to first data of data blocks included in the index, and may determine a data block including the determined data. As described above, a plurality of sets of data of the dictionary is sorted based on a data value, and the index includes the first data of the respective data blocks. Accordingly, the data block determiner 752 may identify which data of the index the determined data is or the range between which the determined data is included. Accordingly, when data of the index is specified, the data block determiner 752 may determine a data block including the specified data as first data, as a data block that includes the determined data.

In operation 930, the response generator 753 may read the determined data block and may generate a response to the query using the data block. Big data is stored in a storage device, such as a hard disk, a solid-state drive, an optical disk drive, a tape drive, etc., that requires a relatively long read time compared to a memory, such as local cache memory, RAM, etc. The processing system 700 may read only required data, for example, only data of the determined data block, thereby guaranteeing a fast processing time, instead of fully scanning the big data, but is not limited thereto.

According to other example embodiments, the processor 702 may be configured to execute program codes for a row reconfigurer 761. When executed by a processor, such as the processor 702, the computer-readable instructions associated with the row reconfigurer 761 transform the processor 702 into a special purpose processor configured to perform at least operation 1010 of FIG. 10 that may be further included in the processing method of FIG. 8.

In the dictionary, a row ID for identifying row order in the big data of each data included in a data block may be stored in association with corresponding data.

In operation 1010, the row reconfigurer 761 may reconfigure a row of the big data using the row ID of the data included in the dictionary. For example, a single row may be reconfigured by extracting only a plurality of sets of data having the same row ID from dictionaries.

According to other example embodiments, the processor 702 may be configured to execute program codes for a data extractor 771. When executed by a processor, such as the processor 702, the computer-readable instructions associated with the data extractor 771 transform the processor 702 into a special purpose processor configured to perform at least operation 1110 of FIG. 11 that may be further included in the processing method of FIG. 8.

In operation 1110, the data extractor 771 may extract a column ID of requested row order from a column ID block of a dictionary corresponding to a received query, and may extract data of a location or order identified by the extracted column ID.

Matters not described in connection with FIGS. 7 and 8 may refer to the description made above with reference to FIGS. 2 through 6.

According to at least one example embodiment, it is possible to contribute to enabling many people to acquire insight and to create value by efficiently processing and analyzing big data using a columnar index data format, and thereby quickly analyzing and visualizing data in various perspectives beyond a current situation of simply storing a large amount of data and providing a slow search/analysis.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of processing a big data database at a processing system including at least one computer, the method comprising:
    sorting, using at least one processor of the at least one computer, data of a big data database based on each column of the big data database and values of the data;
    generating, using the at least one processor, a dictionary for each column of the big data database based on the sorted data;
    classifying, using the at least one processor, the sorted data into one or more data blocks for each of the dictionaries based on a desired data size;
    generating, using the at least one processor, an index for each of the dictionaries, the index including first data values of each of the data blocks of each of the dictionaries in an order of the data blocks in the dictionaries;
    generating, using the at least one processor, a column ID for each column of the dictionaries based on a row order corresponding to an original order of rows of the big data;
        generating, using the at least one processor, a column ID block for each of the column IDs, the column ID block storing a corresponding column ID as the row order of the big data, the column ID being a value for identifying a location or order of data of a corresponding dictionary, wherein
        each of the dictionaries include a dictionary identifier, an index field, and a column ID field,
        the index field includes references to at least one index block corresponding to at least one of the indexes for each of the dictionaries, and
        the column ID field includes references to at least one column ID block;
    loading, using the at least one processor, the indexes for each of the dictionaries to a memory of the at least one computer;
    determining, using the at least one processor, data responsive to a database operation received by the at least one computer, the determining including comparing data values of the indexes for each of the dictionaries and determining a data block corresponding to the determined data responsive to the received database operation; and
    reading, using the at least one processor, the determined data block and generating a response to the database operation using the data block.

2. The method of claim 1, wherein the dictionary includes a row ID for identifying a row order in the big data database of each data included in a data block is stored in association with corresponding data.

3. The method of claim 2, further comprising:
    reconfiguring, using the at least one processor, at least one row of the big data database using the row ID of the data included in the dictionary.

4. The method of claim 1, further comprising:
    extracting, using the at least one processor, the column ID of a requested row order from the column ID block of the dictionary corresponding to a received query; and
    extracting data of the location or order corresponding to the extracted column ID.

5. A non-transitory computer-readable medium storing computer readable instructions, which when executed by a at least one processor, configure the at least one processor to implement the method of claim 1.

6. A processing apparatus to process big data, the processing apparatus comprising:
    a memory having computer readable instructions stored thereon; and
    at least one processor configured to execute the computer readable instructions to,
        sort data of a big data database based on each column of the big data database and values of the data;
        generate a dictionary for each column of the big database based on the sorted data;

classify the sorted data into one or more data blocks for each of the dictionaries based on a desired data size;

generate an index for each of the dictionaries, the index including first data values of each of the data blocks of each of the dictionaries in an order of the data blocks in the dictionaries;

generate a column ID for each column of the dictionaries based on a row order corresponding to an original order of rows of the big data;

generate a column ID block for each of the column IDs, the column ID block storing a corresponding column ID as the row order of the big data, the column ID being a value for identifying a location or order of data of a corresponding dictionary, wherein each of the dictionaries includes a dictionary identifier, an index field, and a column ID field, the index field includes references to at least one index block, and the column ID field includes references to at least one column ID block;

load the indexes for each of the dictionaries to the memory;

determine data responsive to a received database operation, the determining including comparing data values of the indexes for each of the dictionaries and determining a data block corresponding to the determined data responsive to the received database operation; and read the determined data block and generate a response to the database operation using the data block.

7. The processing apparatus of claim 6, wherein the dictionary includes a row ID for identifying a row order in the big data database of each data included in a data block is stored in association with corresponding data.

8. The processing apparatus of claim 7, wherein the at least one processor is further configured to:

reconfigure at least one row of the big data database using the row ID of the data included in the dictionary.

9. The processing apparatus of claim 7, wherein the at least one processor is further configured to:

extract the column ID of a requested row order from the column ID block of the dictionary corresponding to a received query; and extract data of the location or order corresponding to the extracted column ID.

10. A distributed big data database processing system comprising:

a plurality of distributed processing apparatuses, each of the plurality of processing apparatuses connected to a computer network and configured to, sort data of a big data database stored on at least one non-transitory computer storage medium based on each column of the big data database and values of the data, generate a dictionary for each column of the big database based on the sorted data, classify the sorted data into a plurality of data blocks for each of the dictionaries, generate a columnar index for each of the dictionaries, the index including first data values of each of the data blocks of each of the dictionaries in an order of the data blocks in the dictionaries, the generating the columnar index including, generating a column ID block for each of the dictionaries, the column ID block storing a column ID as the row order of the big data, the column ID being a value for identifying a location or order of data of a corresponding dictionary, wherein each of the dictionaries includes a dictionary identifier, an index field, and a column ID field, the index field includes references to at least one index block, and the column ID field includes references to at least one column ID block, store the columnar index and the column ID block on the at least one non-transitory computer storage medium, receive a transmitted big data database operation request over the computer network, retrieve the data requested by the received big data database operation from the non-transitory computer storage medium using the columnar index, the retrieving including, determining data responsive to the received big data database operation, the determining including comparing data values of the at least one index block of the columnar index and determining a data block corresponding to the determined data value, and reading the determined data block from the corresponding non-transitory computer storage medium, and transmit the retrieved data to at least one client computer.

11. The distributed big data database processing system of claim 10, wherein the corresponding non-transitory computer storage medium is accessed over the computer network.

12. The distributed big data database processing system of claim 10, wherein the big data database is at least one of a Database Management Systems (DBMS) database, a Relational Database Management Systems (RDBMS) database, a SQL-based database, an Object-oriented relational database, a NoSQL database, a NewSQL database, and a structured language database.

13. The distributed big data database processing system of claim 10, wherein the number of dictionaries corresponds to the number of columns in the big data database.

* * * * *